(12) United States Patent
Neemann et al.

(10) Patent No.: US 7,431,207 B1
(45) Date of Patent: Oct. 7, 2008

(54) SYSTEM AND METHOD FOR TWO-STEP PAYMENT TRANSACTION AUTHORIZATIONS

(75) Inventors: Trey Neemann, Glendale, AZ (US); Fred Bishop, Glendale, AZ (US); Michael Barrett, Phoenix, AZ (US); David Armes, Phoenix, AZ (US)

(73) Assignee: American Express Travel Related Services Co., Inc., New York, NY (US)

( * ) Notice: Subject to any disclaimer, the term of this patent is extended or adjusted under 35 U.S.C. 154(b) by 213 days.

(21) Appl. No.: 11/031,111

(22) Filed: Jan. 5, 2005

(51) Int. Cl.
*G06K 5/00* (2006.01)

(52) U.S. Cl. .................... 235/380; 235/382; 705/39

(58) Field of Classification Search .......... 235/380, 235/382; 705/39, 64; 713/186
See application file for complete search history.

(56) References Cited

U.S. PATENT DOCUMENTS

| | | | |
|---|---|---|---|
| 6,263,447 B1* | 7/2001 | French et al. ................ 726/5 |
| 6,339,766 B1* | 1/2002 | Gephart ..................... 705/44 |
| 6,928,546 B1* | 8/2005 | Nanavati et al. ........... 713/186 |
| 7,100,821 B2* | 9/2006 | Rasti ........................ 235/380 |
| 2002/0062291 A1* | 5/2002 | Zoka .......................... 705/64 |
| 2002/0111919 A1* | 8/2002 | Weller et al. ................ 705/67 |
| 2002/0120846 A1* | 8/2002 | Stewart et al. ............. 713/168 |
| 2002/0194138 A1* | 12/2002 | Dominguez et al. .......... 705/64 |
| 2003/0028481 A1* | 2/2003 | Flitcroft et al. ............. 705/39 |
| 2003/0061172 A1* | 3/2003 | Robinson .................... 705/67 |
| 2003/0080183 A1* | 5/2003 | Rajasekaran et al. ........ 235/379 |
| 2004/0083394 A1* | 4/2004 | Brebner et al. ............. 713/202 |
| 2005/0097049 A1* | 5/2005 | Writer et al. ................ 705/44 |
| 2006/0016877 A1* | 1/2006 | Bonalle et al. ............. 235/380 |
| 2006/0161435 A1* | 7/2006 | Atef et al. ................... 704/246 |

\* cited by examiner

*Primary Examiner*—Daniel A Hess
(74) *Attorney, Agent, or Firm*—Fitzpatrick, Cella, Harper & Scinto (57) ABSTRACT

To process a commercial transaction, a merchant receives a card payment request from a customer. The merchant redirects the customer to the card issuer. The authorization computer of the card issuer communicates with the customer and authenticates the identity of the customer as the true cardholder of the card presented for payment. In a first embodiment, the merchant submits an authorization request in response to a card payment request to the authorization computer. The merchant receives an authorization confirmation from the authorization computer upon authentication of the identity of the cardholder. In a second embodiment, the customer receives an authorization confirmation from the authorization computer upon the authentication of the identity of the cardholder. The customer then submits the authorization confirmation to the merchant. The merchant, in turn, confirms the authorization confirmation with the authorization computer.

16 Claims, 5 Drawing Sheets

SYSTEM AND METHOD FOR TWO-STEP PAYMENT TRANSACTION AUTHORIZATIONS

FIELD OF THE INVENTION

The present invention relates to payment instrument (e.g., credit, debit or charge card) transactions. More particularly, the present invention relates a method and system for authorizing transactions.

BACKGROUND OF THE INVENTION

When using a card to make a purchase, the merchant passes the card number, other information from the card (such as the expiration date), the charge amount, and the merchant number to the card issuer to authorize the payment being requested by the customer. The authorization serves to verify the account while analyzing its current state for the purpose of producing a recommendation to the merchant as to whether they should accept or reject the purchase using the presented payment instrument.

When a purchase is being made at a "brick and mortar" (i.e., physical, real, storefront, offline) merchant, the card information for completing the authorization is captured by swiping the card through a card reader attached to a Point-of-Sale (POS) device. Such purchases are referred to as "card present" transactions. When the purchase is being made online or over the telephone, the customer enters or provides the card information to the merchant without the merchant ever seeing the customer or the card. These types of transactions are referred to as "card not present" transactions, and are characterized by a higher incidence of fraud than "card present" transactions. For online merchants in 2000, this rate was 10 times higher per volume than that experienced by other merchants. More to the point, fraud accounted for roughly 1.5% of total sales for online merchants as opposed to 0.1% for offline merchants. Because of the "card not present" condition, any reported incident of fraud for online commerce becomes the financial responsibility of the merchant, and not the issuer or customer. Thus, the fraudulent 1.5% of total sales is a direct cost, and thus a problem for merchants.

Figure 1:
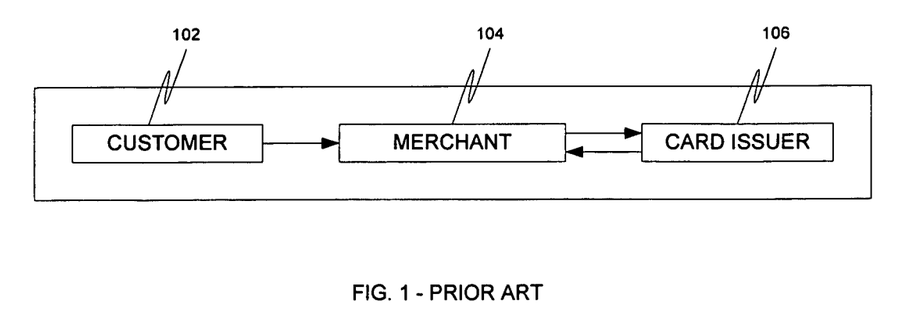
FIG. 1 is a diagram schematically illustrating a common process for authorizing a card transaction.

FIG. 1 illustrates the above online authorization process. The linear process includes a customer 102, a merchant 104, and a (debit, credit, charge or other payment) card issuer 106 with merchant 104 as the broker for the entire transaction. Merchant 104 collects all the information regarding the transaction from itself and customer 102, then requests the payment be authorized by issuer 106. The decision of card issuer 106 is returned to merchant 104 to complete the purchase (or if the authorization fails, merchant 104 will reject the customer payment). When faced with the fact that online merchant 104 never "sees" customer 102 or the card being used for the payment (i.e., "card not present"), it is understandable why merchant 104 is held completely responsible for any fraudulent transactions.

There are also several causal affects of fraud on online commerce and merchants. First, because of the cost associated with managing fraud, merchants' payment processors/providers assess a discount rate that is typically almost twice that applied to corresponding brick-and-mortar merchants. Taking this increased discount rate into account can amount to another 1.4% of loss for every online transaction in which a merchant engages in due to the manner in which such payments are being processed. Second, there are numerous surveys and reports that describe the resistance and hesitancy of many customers to participate in online commerce because of concerns around security, specifically fraudulent use of their card instruments. These concerns keep potential customers away from online merchants and reduce the potential volume that they might otherwise experience. Accordingly, a need therefore exist for a mechanism to reduce card transaction fraud.

BRIEF DESCRIPTION OF THE INVENTION

To process a commercial transaction, a merchant receives a card payment request from a customer. The merchant redirects the customer to the card issuer. The authorization computer of the card issuer communicates with the customer and authenticates the identity of the customer as the true cardholder of the card presented for payment. In a first embodiment, the merchant submits an authorization request in response to a card payment request to the authorization computer. The merchant receives an authorization confirmation from the authorization computer upon authentication of the identity of the cardholder. In a second embodiment, the customer receives an authorization confirmation from the authorization computer upon the authentication of the identity of the cardholder. The customer then submits the authorization confirmation to the merchant. The merchant, in turn, confirms the authorization confirmation with the authorization computer.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a card transaction. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

Figure 2:
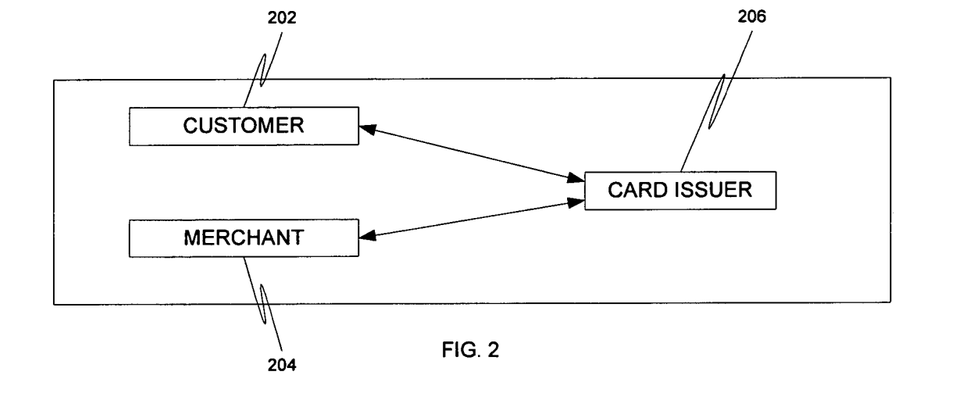
FIG. 2 is a block diagram schematically illustrating an authorization process in accordance with one embodiment of the present invention.

FIG. 2 illustrates a process for authorizing a card transaction. The process integrates a customer 202 into the authorization process along with a merchant 204. Instead of relying on merchant 204 to capture the customer information for the payment, this process shifts that responsibility back to customer 202. A card issuer 206 then accepts data from two parties (customer 202 and merchant 204) instead of one. Exposing customer 202 to card issuer 206 allows card issuer 206 to request additional information from customer 202 to confirm their identity and capacity for using the presented card for payment. Although the card itself is still not physically present, taking the additional steps to authenticate the identity of customer 202 as the true cardholder reduces the risk of the card is being improperly used, while also reducing the ability of customer 202 to dispute the transaction (i.e., non-repudiation).

Figure 3:
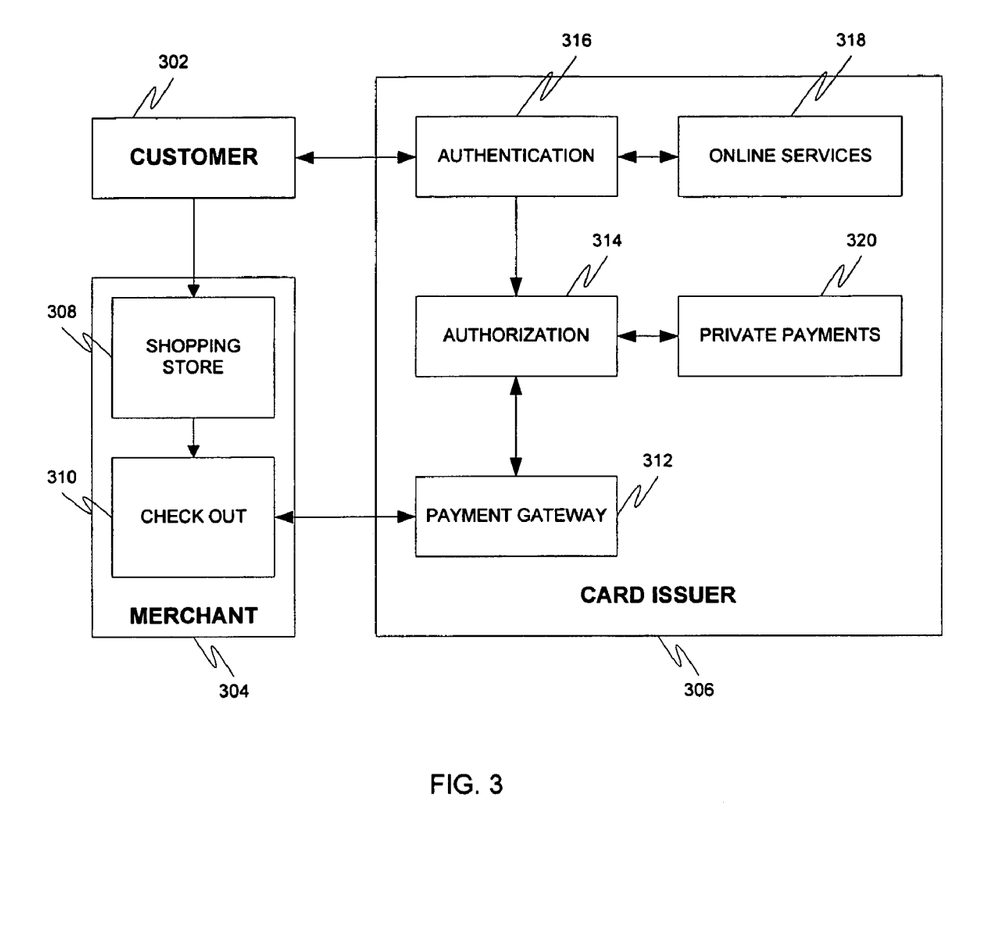
FIG. 3 is a block diagram schematically illustrating an authorization process in accordance with a first embodiment of the present invention.
Figure 4:
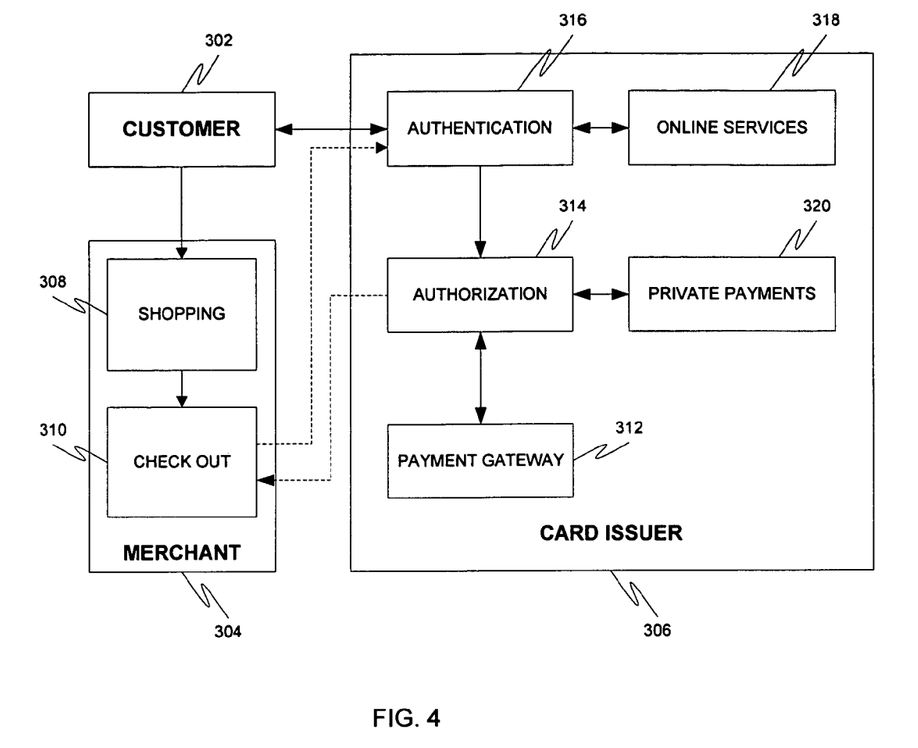
FIG. 4 is a block diagram schematically illustrating an authorization process in accordance with a second embodiment of the present invention.

With the above process in mind, FIGS. 3 and 4 illustrates two different embodiments that can be used for moving or exchanging information between three parties—customer 302, merchant 304 and card issuer 306. Each embodiment provides the same capabilities, with the only difference being when and where information is actually exchanged. Therefore, instead of providing a full description for each variation, only the first will be a full description while the other will focus on the flow differences.

FIG. 3 illustrates the above process in accordance with a first embodiment. A customer 302 goes to an online merchant 304, where customer 302 proceeds to select various goods and services for purchase from an online store 308 of online merchant 304. Once customer 302 is done shopping, they may proceed to the merchant Check Out site 310 where they identify the pertinent shipping and payment information to complete the purchase. Traditionally, merchant 304 requests that customer 308 enter the card number and details (e.g., expiration date) onto an online form that is then authorized by card issuer 306. Customer 302 is asked how they will be paying for the purchase. If online merchant 304 site recognizes the response as a debit, credit, charge or other payment card, customer 302 is redirected to an Authentication site 316 hosted by the corresponding card issuer 306.

While customer 302 is being redirected to Authentication site 316, merchant 304 issues an encrypted two-party authorization request to card issuer 306 through a Payment Gateway 312. The encrypted two-party authorization request includes an affirmation of the identity of merchant 304, an amount of the transaction, and a reference ticket for the transaction. The purpose of the reference ticket in this form is two-fold. It is used to identify the corresponding data provided by customer 302 for the authorization, and it provides a unique identifier that can be used to prevent replay attacks (another form of online fraud where a transaction is requested several times). Since there is no customer data available in the authorization request, an authorization system 314 stores the request and waits for the customer data.

Upon arriving at Authentication site 316, customer 302 is requested to provide some data (discussed below) before the authorization and purchase can continue. Since no card number has yet been identified, the actual card number to be used for the payment must be supplied by customer 302. Additionally, customer 302 will also be asked to verify their use of this card by authenticating their identity. In alternate embodiments, different methods may be employed for such authentication, including:

identifying the expiration date and CID on the card, and/or the billing address and home address;

identifying the telephone number defined for the account;

providing a user ID and password that has previously been associated with the card;

using a smartcard and PIN that has been previously associated with the card; or using a biometric signature that has been previously associated with the card.

These methods may be used singularly or in combination with one another as designated by customer 302 for this transaction. In an embodiment, card issuer 306 does not make any specific demands on customer 302 regarding the method(s) they wish to use to authenticate their identity. Although customer 302 may typically use a biometric signature to authenticate their identity, card issuer 306 does not expect this same level of authentication each time the customer makes a purchase. Instead, this activity can be tracked along with actual fraud occurrences, and be used to develop new fraud models that can be used and applied while authenticating online customer purchases.

The above-listed methods for authenticating the identity of customer 302 provide a framework for authenticating customers and are not intended to be exhaustive. As new methods or approaches for verifying a customer's identity are defined, they can be added to the framework with little effect on the existing methods that are available.

In an embodiment, as each of the above-listed methods for authenticating the identity of customer 302 is used, the values entered by customer 302 during the validation process (e.g., data values, the smartcard certificate or biometric signature) are validated against those stored in a database (not shown) at an Online Services site 318 of card issuer 306 for the defined card. As the customer-entered values are compared with those in the database, in alternate embodiments, other rules may be implemented and enforced which require other customer actions before continuing. For example, customer 302 may use only the card details (expiration date and CID for the card) to authenticate. However, a suspicious shipping address submitted by customer 302 may prompt a request for additional information, such as the billing address or home telephone number associated to the card.

The results of the Authentication site 316 are used to derive a corresponding score to represent the relative reliability of the customer authentication. For example, a customer using only the card expiration date and CID would receive a low score, while customers using a combination of the card information and smartcard with PIN and a verified biometric signature would receive a higher score. In an embodiment, any authentication failures may also be included into how the score is calculated. This is especially important for biometric signatures where 'false negative' results are frequently produced. For example, a fingerprint authentication may fail because customer 302 may have a cut on their finger. Although an outright rejection is probably an inappropriate conclusion, especially if the customer passed any other authentication methods, the biometric failure is factored into the resulting score.

Upon authentication of the identity of customer 302, an Authorization site 314 may issue an authorization code. This authorization code along with the authentication score are provided to merchant 304 in response to the two-party authorization request to Payment Gateway 312.

Merchant 304 may then continue with the purchase transaction according to its own internal risk management rules. Typically, these rules rely solely on the result ("approved" or "declined") produced by the authorization process of card issuer 306. With the authentication score, however, merchant 304 can now decide which payments they are willing to accept. For example, merchant 304 may decide the minimum score they are willing to accept the use of a user ID and password. For this particular merchant, any transactions where customer 302 used only the card details to authenticate their identity would be rejected. Alternatively, card issuer 306 could apply an authentication score threshold for merchant 304 while customer 302 is authenticating their identity. This approach would be preferable, as customer 302 would be notified immediately that additional credentials are needed to continue with the purchase instead of waiting until the entire process appears to be completed.

In prior card transactions, an online merchant has little or no recourse for recovering any loss from a fraudulent online transaction in a "card not present" situation. Since the merchant is an online merchant, the card issuer credits the cardholder's account and debits the merchant account (referred to as a chargeback) for the payment amount.

This problem changes through using the proposed system, as card issuer 306 is also authenticating the identity of customer 302. If card issuer 306 indicates a high likelihood that customer 302 is who they claim to be and is authorized to use the card, it makes it very difficult for merchant 304 to be held completely accountable for a fraudulent payment. Therefore, usage of the authentication score can be integrated into the dispute process to drive the rules for determining responsibility for the fraudulent payment. Different rules will be used based on the authentication method(s) used by customer 302 and accepted by merchant 304. For example, if customer 302 is authenticated with only the details on the card, merchant 304 may still be held accountable. But, if customer 302 is authenticated with a smartcard with PIN and a biometric device, card issuer 306 or customer 302 may be most likely held responsible for the payment.

Once the authentication score has been compiled, the card information and authentication score are forwarded to Authorization site 314. Customer 302 returns to Check Out site 310 to complete their purchase. The authorization site 314 itself does not use the authentication score, but serves as a collection point for returning all risk management information to merchant 304 (for example, the authorization code and the authentication score).

While customer 302 has been returned to merchant checkout site 310 to complete their purchase, merchant 304 is waiting for a response from their authorization request for the payment. Authorization site 314 has received merchant 304 and customer 302 information that needs to be evaluated for the merchant request. Instead of a linear flow from customer 102 to merchant 104 to card issuer 106 (for authorization) and back as illustrated in FIG. 1, the present process flow is more circular requiring two parties to leave from a single point, provide their respective data to authorization site 314 and return to the beginning point.

Authorization site 314 receives customer data provided by Authentication site 316. Merchant 304 has previously submitted its data that Authorization site 314 has stored away while waiting for customer data. The merchant reference ticket which was included in its authorization request and in the request directed to the Authentication site 316, is used to match merchant and customer data together so it can be processed by Authorization site 314. Authorization site 314 then applies its existing rules and conditions to identify the response that will be recommended to merchant 304. If the purchase is declined, Authorization site 314 formats an appropriate response that is returned to merchant 304 through Payment Gateway 312. If the request is approved, a request is made to a Private Payments site 320 to create a private payment number for the selected card.

In one embodiment, a private payment number may be used to hide and protect the actual card number is a voluntary act by customer 302, which limits the protection it offers to a much smaller set of customers. The private payment number is also discussed in U.S. patent application Ser. No. 09/800, 461 filed on Mar. 7, 2001, and also in related provisional U.S. Patent Application Ser. No. 60/187,620 filed Mar. 7, 2000, Ser. No. 60/200,625 filed Apr. 28, 2000 and Ser. No. 60/213, 323 filed May 22, 2000, all of which are herein incorporated by reference. Merchant 304 does not collect any of the customer payment information, and the only card number they see is the one returned by the authorization request from card issuer 306. Following the payment authorization, a private payment number is automatically generated and provided to merchant 304 as the card for payment. This proactive use of a private payment number provides greater protection and privacy to customer 302. This approach relieves customer 302 from registering for a private payment number in advance then remembering that number when identifying the payment instrument to merchant 304. The selected card number is always hidden from the merchant as a standard practice instead of being a customer choice. In fact, since the private payment assignment is made following the authorization, there is no recognition by customer 302 that a private payment number is even being used.

Once the private payment number has been established, it is returned to Authorization site 314, which then constructs the response to the request of merchant 304. This response may be encrypted and signed to prove it originated from card issuer 306. The response may also contain the private payment number, the authorization code, and the authentication code, as well as any other data required for the returning message. The response is then returned to merchant 304 through Payment Gateway 312. As mentioned previously, merchant 304 may accepts the response and acts on the response according to its risk management rules to complete the purchase. If accepted, merchant 304 forwards the purchase request onto it fulfillment and settlement systems (not shown). The fulfillment system is responsible for delivering the merchandise to customer 304, while the settlement system is responsible for managing the submission, payment and reconciliation of the payment with its payment processor/provider (not shown).

Since the authentication score will be used to drive the resolution of fraud related disputes for participating merchants, it is important that the score be stored. Since changing the submission format for payments to include this new field would be difficult to implement for all merchants, the information is retained and managed internally by the card issuer 306. The authentication code could be stored in either Private Payments site 320 or within Authorization site 314. If stored in Private Payments site 320, it becomes another attribute that is available as the private payment number is translated into the real card number. If stored in Authorization site 314, the authorization code included in each submission may be used to locate any extended authorization attributes for the payment. Additionally, since the method for resolving these disputes will follow discrete, well-defined rules, merchant 304 may store the score for their use, specifically when accepting chargebacks and refining their risk management policies.

In summary, FIG. 3 illustrates an authorization process in accordance with a first embodiment with multiple interface paths for the authorization to be completed. When merchant 304 recognizes the intent to use a payment card for payment, it follows with two divergent actions. The first is to forward an authorization request to card issuer 306, followed by redirecting customer 302 to Authentication site 316 and Online Services site 318 where they will be required to identify the specific instrument to be used for the payment and to authenticate their identity. When completed, customer 302 is returned to merchant site 304 and the entered information is forwarded to Authorization site 314 where the entered information is combined with the merchant's data and authorized using the existing rules and conditions provided by that system. When completed, Authorization site 314 provides a response back to the original merchant request.

FIG. 4 illustrates an authorization process in accordance with a second embodiment. The main difference with the process of FIG. 3 is that the authorization code is returned through customer 302. Instead of merchant 304 sending a request to card issuer 306 and redirecting customer 302 to card issuer 306, this option includes all data in the information as part of the customer redirect. Merchant 304 does not directly interact with card issuer 306, but does so indirectly through the customer 302 (this is why it is important that card issuer 306 authenticates its identity by signing the response and including a digital certificate). Another difference is that customer 302 waits for the authorization to be completed before they are returned to merchant 304. When customer 302 returns to the merchant, all the information for merchant 304 to complete the purchase will be present in the message.

One of the advantages of this embodiment is the session management of merchant 304 is greatly simplified. When merchant 304 receives the response from customer 302, the response contains everything merchant 304 needs to complete the purchase, and no other interface is required. There is no waiting for a matching response from card issuer 306, as it is included in the message from customer 302.

Figure 5:
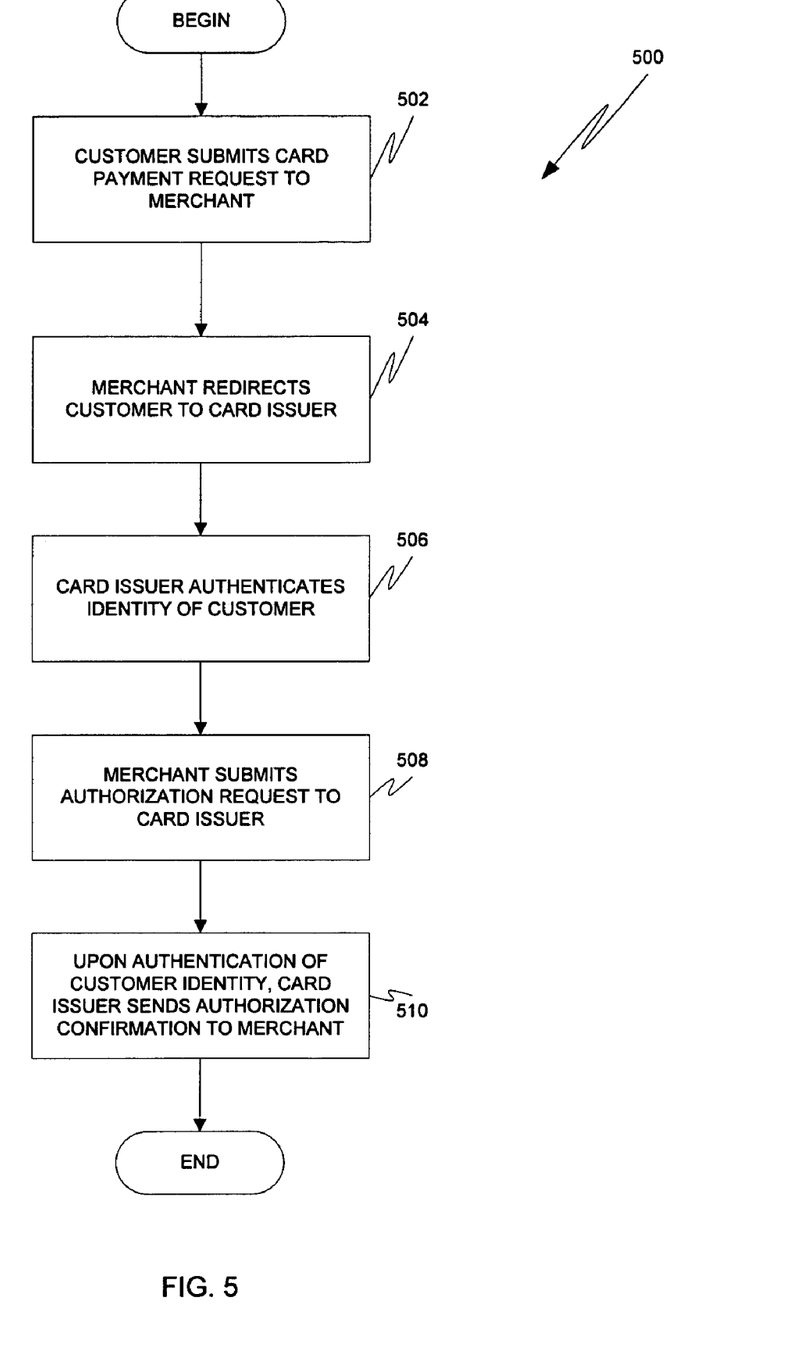
FIG. 5 is a flow diagram schematically illustrating a method for authorizing a card transaction in accordance with a first embodiment of the present invention.

FIG. 5 is a flow diagram illustrating a process 500 for authorizing a card transaction in accordance with a first embodiment. At 502, a customer submits a card payment request to a merchant. At 504, the merchant redirects the customer to communicate with an authorizing computer of the card issuer. At 506, the authorizing computer authenticates the identity of the customer as the true cardholder. At 508, the merchant submits an authorization request in response to the card payment request to the authorization computer. At 510, upon authenticating the identity of the cardholder, the authorization computer submits an authorization confirmation to the merchant.

Figure 6:
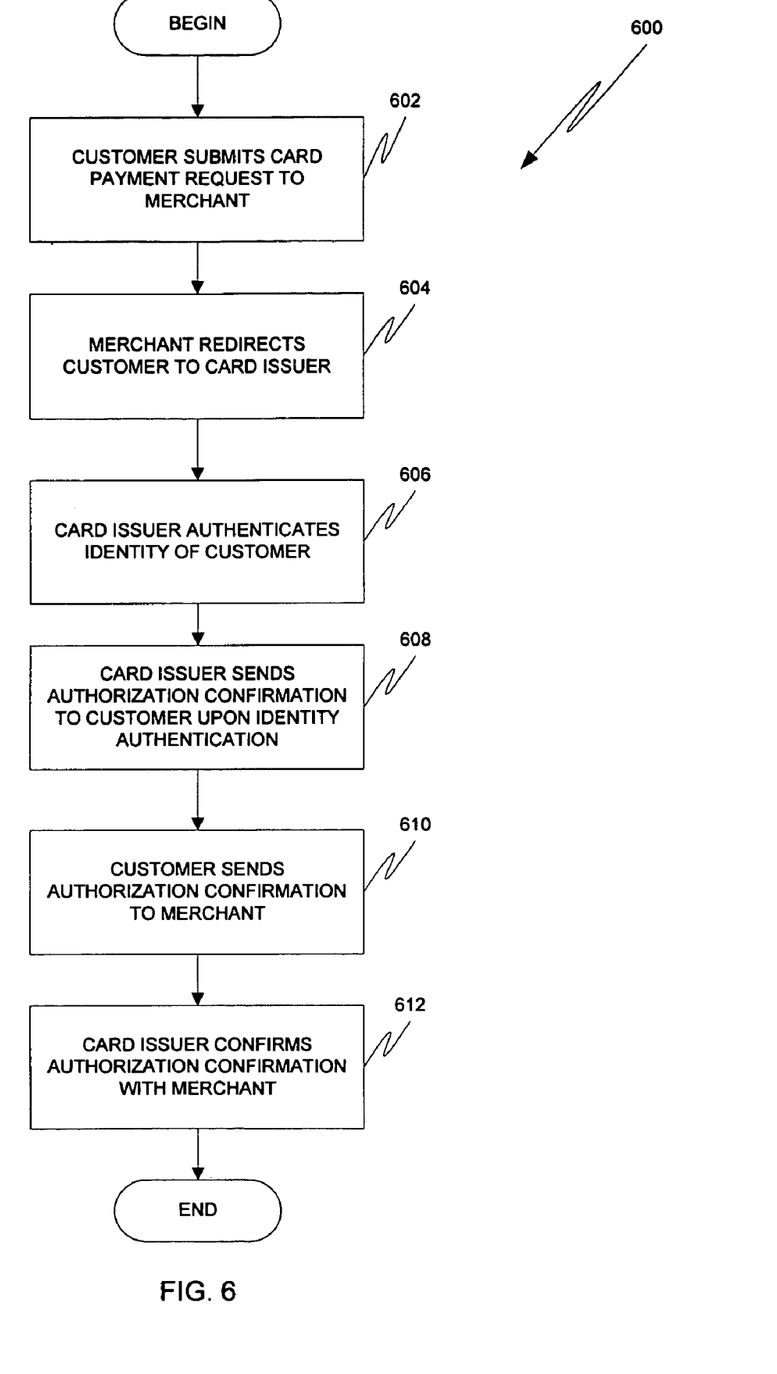
FIG. 6 is a flow diagram schematically illustrating a method for authorizing a card transaction in accordance with a second embodiment of the present invention.

FIG. 6 is a flow diagram illustrating a process 600 for authorizing a commercial transaction in accordance with a second embodiment. At 602, a customer submits a card payment request to a merchant. At 604, the merchant redirects the customer to communicate with an authorizing computer of the card issuer. At 606, the authorizing computer authenticates the identity of the customer as the true cardholder. At 608, upon authenticating the identity of the customer, the authorizing computer issues the customer an authorization confirmation. At 610, the merchant receives the authorization confirmation from the customer. At 612, the authorizing computer confirms the authorization confirmation with the merchant.

The preceding description is not exhaustive in the options and variations that could be leveraged and made available. Following is a list of some possible options that could be provided.

Another service that can be offered to merchants as part of process 500 is to integrate fraud detection capabilities from third parties into the authorization request. Today, many online merchants use third party services to identity potential fraudulent payments before the payment is forwarded to the card issuer for authorizing. As part of this new authorization, this fraud detection could be encapsulated as part of the authorization request and included as an offering to the merchant. Once the authorization has completed, a request would be sent to the third-party fraud detection services along with the appropriate data. The service would apply its rules and return a response (for example, a score) indicating the likelihood that the payment being request is fraudulent. This score would then be included in the authorization response to the merchant to be used in completing in the payment. As with the authentication code, how this score is used is left to the discretion of the merchants and their risk management practices. For example, if the resulting score is less than a preset score chosen by the merchant, the merchant may choose to decline the transaction.

Some merchants may decide they will accept authorization responses that are above some minimum threshold. Knowing that the merchant requires at least a user ID and password authentication to accept the payment, the card issuer can inform the customer while they are providing their identity credentials of this requirement. There is an inherent problem with this approach, as many customers will not have anything besides their physical card with which to authenticate their identity. Therefore, an option could be made available which offers to enroll the customer into an online service such as a card issuer's Online Services 318 to acquire a user ID/password for them to use as an authentication credential. While providing a means for authenticating their identity for online payments, the customer can also be exposed to other online services available through this system such as "Check Your Bill", "Pay Your Bill" and other secure services available on many card issuer's Web sites.

When the authorization result is returned to the merchant, any failures direct the customer to contact a service center regarding the declined payment (referred to as a "Please Call" message). Unless the customer uses a different card, their current purchase is lost as they contact the card issuer to reconcile the problem preventing the authorization to be completed. With respect to the second embodiment, since the customer is waiting for the authorization to be completed before they are returned to the merchant site, any problems that are encountered during the authorization can be immediately referred to the customer for resolution. This can be done by prompting for additional personal information to verify their identity, or even establishing an interactive chat session between the customer and a customer service representative whereby any problems can be resolved before returning to the merchant.

Most customers trying to make payments on the Internet do not have a smartcard with which to authenticate their identity. This becomes a problem as it requires not just the physical card, but also that the accompanying reader be distributed to the customers which must then be installed and configured on their computer. Instead of using a physical smartcard, a virtual smartcard or "PinVault" could be established and used as an authentication method. A pin vault is a combination user ID/password and smartcard implementation. Within a secure server, the credentials for participating customers are stored, but the credentials can only be accessed once a user ID/password has been provided. However, instead of the credential being exposed, a digital signature for the credential is provided for authentication.

The present invention provides both a direct and indirect financial incentive to merchants to use this approach for authorizing payments. With more information being available to determine if a payment is an acceptable risk and whether to accept or reject it, merchants can directly eliminate those payments appearing risky. Allowing the issuer to authenticate the customer makes the responsibility shared between the issuer, customer and merchant as is done with brick and mortar merchants. Being sure of the identity of the customer will reduce instances of card fraud for online payments, which will give merchants greater leverage in negotiating (i.e., lowering) discount rates being assessed by card issuers.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for processing a commercial transaction comprising:
    submitting a card payment request to a merchant;
    initiating a communication between a cardholder submitting the card payment request and an authorization computer of an issuer;
    receiving an authorization request from said merchant in response to said card payment request;
    authenticating an identity of said cardholder using information received from said cardholder, said authenticating including matching said information received from said cardholder with a corresponding predetermined stored value and generating an authentication score representing a relative reliability of the identity of the cardholder based on the information from said cardholder;
    matching the authorization request to said cardholder;
    authorizing the authorization request and, if the authorization request is approved, generating a private payment number; and
    issuing an authorization confirmation including the authorization score and the private payment number to said merchant upon authorizing the authorization request.

2. The method of claim 1, wherein said merchant determines whether to accept said card payment request in response to said authorization confirmation and said authenticating.

3. The method of claim 1, wherein said card payment request comprises an account code and an identification code.

4. The method of claim 1, wherein said authorization request comprises an identifier of said merchant, a payment amount, a payment date, and a reference number.

5. The method of claim 1, wherein said information from said cardholder comprises one of an expiration date, an identification code, a user ID, a password, a smart card, and a biometric signature.

6. The method of claim 1, wherein said authorization request comprises a request for authorization to said merchant to accept said card payment request.

7. A method for processing a commercial transaction comprising:
    initiating a communication between a cardholder an authorization computer of an issuer prior to submitting a card payment request;
    authenticating an identity of said cardholder using information received from said cardholder, said authenticating including matching said information received from said cardholder with a corresponding predetermined stored value and generating an authentication score representing a relative reliability of the identity of the cardholder based on the information from said cardholder;
    authorizing an authorization request and, if said authorization request is approved, generating a private payment number;
    issuing an authorization confirmation including said authentication score and said private payment number to said cardholder upon authorizing said authorization request, said cardholder submitting said card payment request associated with said authorization confirmation to a merchant; and
    confirming said authorization confirmation with said merchant.

8. The method of claim 7, wherein said merchant determines to accept said card payment request in response to said authorization confirmation and said authenticating.

9. The method of claim 7, wherein said card payment request comprises an account code and an identification code.

10. The method of claim 7, wherein said card payment request comprises an identifier of said merchant, a payment amount, a payment date, and a reference number.

11. The method of claim 7, wherein said information from said cardholder comprises one of an expiration date, an identification code, a user ID, a password, a smart card, and a biometric signature.

12. A program storage device readable by a machine, tangibly embodying a program of instructions executable by said machine to perform a method for processing a commercial transaction, the method including:
- submitting a card payment request to a merchant;
- initiating a communication between a cardholder submitting the card payment request and an authorization computer of an issuer;
- receiving an authorization request from said merchant in response to said card payment request;
- authenticating an identity of said cardholder using information received from said cardholder, said authenticating including matching said information received from said cardholder with a corresponding predetermined stored value and generating an authentication score representing a relative reliability of the identity of the cardholder based on the information from said cardholder;
- matching the authorization request to said cardholder using the authorization system;
- authorizing the authorization request and, if the authorization request is approved, generating a private payment number; and
- issuing an authorization confirmation including the authorization score to said merchant upon authorizing the authorization request.

13. The method of claim 12, wherein said authorization request comprises a request for authorization to said merchant to accept said card payment request.

14. A program storage device readable by a machine on behalf of a merchant, tangibly embodying a program of instructions executable by said machine to perform a method for processing a commercial transaction, the method including:
- initiating a communication between a cardholder an authorization computer of an issuer prior to submitting a card payment request;
- authenticating an identity of said cardholder using information received from said cardholder, said authenticating including matching said information received from said cardholder with a corresponding predetermined stored value and generating an authentication score representing a relative reliability of the identity of the cardholder based on the information from said cardholder;
- authorizing an authorization request and, if said authorization request is approved, generating a private payment number;
- issuing an authorization confirmation including said authentication score and said private payment number to said cardholder upon authorizing said authorization request, said cardholder submitting said card payment request associated with said authorization confirmation to a merchant; and
- issuing an authorization confirmation including said authentication score and said private payment number to said cardholder upon authorizing said authorization request, said cardholder submitting a card payment request associated with said authorization confirmation to a merchant; and
- confirming said authorization confirmation with said merchant.

15. A system for processing a commercial transaction comprising:
- an authentication site configured to receive an authorization request from a merchant in response to a card payment request and authenticate an identity of a cardholder by matching information received from said cardholder with a corresponding predetermined stored value and generating an authentication score representing a relative reliability of the identity of the cardholder based on the information from said cardholder;
- an authorization site coupled to said authentication site, said authorization site configured to authorize the authorization request and to match the authorization request to said cardholder and, if the authorization request is approved, request a private payment number from a private payment site and generate an authorization confirmation including said authentication score and said private payment number and authorize a card payment request from said cardholder upon authorizing said authorization request; and
- a payment gateway site coupled to said authorization site, said payment gateway site being configured to communicate said authorization confirmation to a merchant site.

16. A system for processing a commercial transaction comprising:
- an authentication site configured to authenticate an identity of a cardholder prior to submitting a card payment request by matching information received from said cardholder with a corresponding predetermined stored value and generating an authentication score representing a relative reliability of the identity of the cardholder based on the information from said cardholder; and
- an authorization site coupled to said authentication site, said authorization site being configured to authorize an authorization request and, if the authorize an authorization request is approved, request a private payment number from a private payment site, and issue an authorization confirmation including the authentication score and the private payment number to said cardholder upon authorizing said authorization request, and to confirm said authorization confirmation with a merchant, wherein said merchant receives a card payment request associated with said authorization confirmation from said cardholder.

* * * * *